Jan. 24, 1967     T. W. WELLES     3,300,164
SUPPORTING DEVICE

Filed Aug. 31, 1964     2 Sheets-Sheet 1

INVENTOR
THEODORE W. WELLES
BY
Tillbury & Body
ATTORNEYS

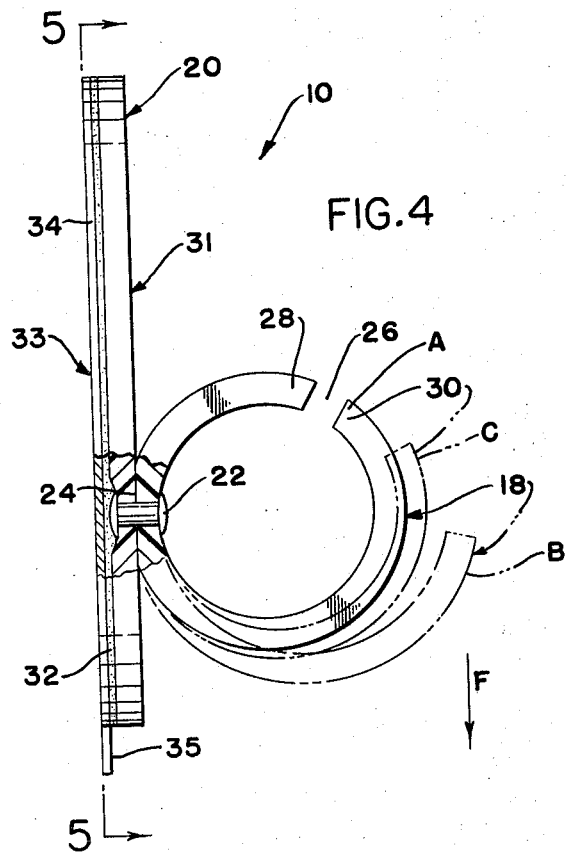
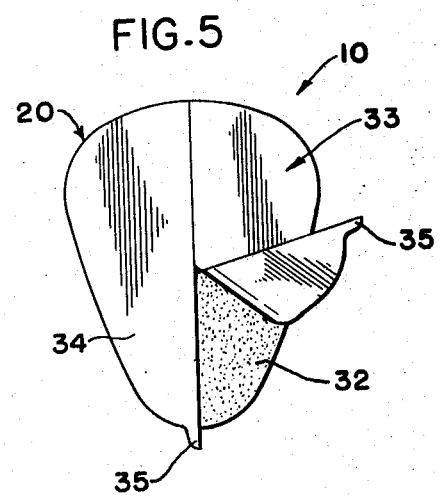

3,300,164
SUPPORTING DEVICE
Theodore W. Welles, Shaker Heights, Ohio
(3049 E. 55th St., Cleveland, Ohio 44127)
Filed Aug. 31, 1964, Ser. No. 393,126
6 Claims. (Cl. 248—95)

This invention relates to the art of supports and more particularly to a hook support for adhesive application to a supporting surface.

The invention is particularly adapted for supporting paper bags such as litter bags from the dashboard of a vehicle and will be described with particular reference thereto, although it will be appreciated that the invention has broader applications and for example may be used to support sanitary napkin disposal bags and the like or be applied on kitchen cabinets for supporting such household articles as keys, food recipes, family notices, etc.

A support device for adhesive application to a surface known heretofore includes a relatively thin walled thermoplastic mounting sheet having a coating of pressure sensitive adhesive on one side and a relatively rigid support means secured on the other side. The support means includes a base portion and a rigid hook portion integrally molded with and extending outwardly from the base portion is bonded to the adhesive coated sheet and is flat and relatively thick walled and rigid as compared with the sheet. Further, the surface area of the base portion which is bonded to the thin sheet is substantially greater than the cross-sectional area of the hook portion.

With this construction such a supporting device cannot be effectively mounted on convex, concave, or irregular surfaces. This is true because the thin sheet is rendered rigid for the portion of its area adjacent the relatively large surface area of the rigid base portion of the support means.

Still further, a support device constructed as set forth above having a rigid upstanding hook portion presents a dangerous obstruction when the support device is mounted, for example, on the dashboard of a vehicle for supporting keys, litter bags, etc. If a passenger in a vehicle having such a support device is thrown against the dashboard as frequently occurs when the vehicle operator is forced to suddenly apply the brakes with great force then needless injury may result if the passenger strikes the rigid upstanding hook portion. It is further obvious that such an obstruction as a rigid upstanding hook secured to a vehicle dashboard will be the source of torn clothes which accidently come in contact with and are snagged or torn by the hook.

The present invention is directed toward an improved construction of a support device for adhesive application to a surface which may be flat, convex, concave or irregular and which overcomes the aforementioned shortcomings of the prior art.

In accordance with this invention there is provided a support device taking the form of a resilient support member secured at substantially a point contact on one side of a relatively thin walled flexible sheet having an adhesive coating on its opposite side for application to a surface whether it be flat, convex, concave or irregular.

In accordance with a still further aspect of this invention the resilient support member takes the form of a split ring secured at a point spaced from the split in substantial tangential relationship to the thin walled flexible sheet.

The primary object of the present invention is to provide a support device for adhesive application to a surface and which is simple in construction and economical to manufacture.

Another object of the present invention is to provide a support device for adhesive application to a surface which may be flat, convex, concave, or irregular.

A still further object of the present invention is to provide a support device adapted for adhesive application to a vehicle dashboard without presenting an obstruction which is dangerous to passengers' physical being or clothing.

A further object is to provide a hook arrangement which is resilient and which may have its opening readily adjustable by the user.

The invention may take physical form in certain parts and arrangement of parts, the preferred embodiment of which will be described in detail in this specification and illustrated in the accompanying drawings which form a part hereof and wherein:

FIGURE 4 is a right side view of the support device illustrated in FIGURE 3; and FIGURE 5 is a rear view of the support device taken along line 5—5 of FIGURE 4.

Figure 1:
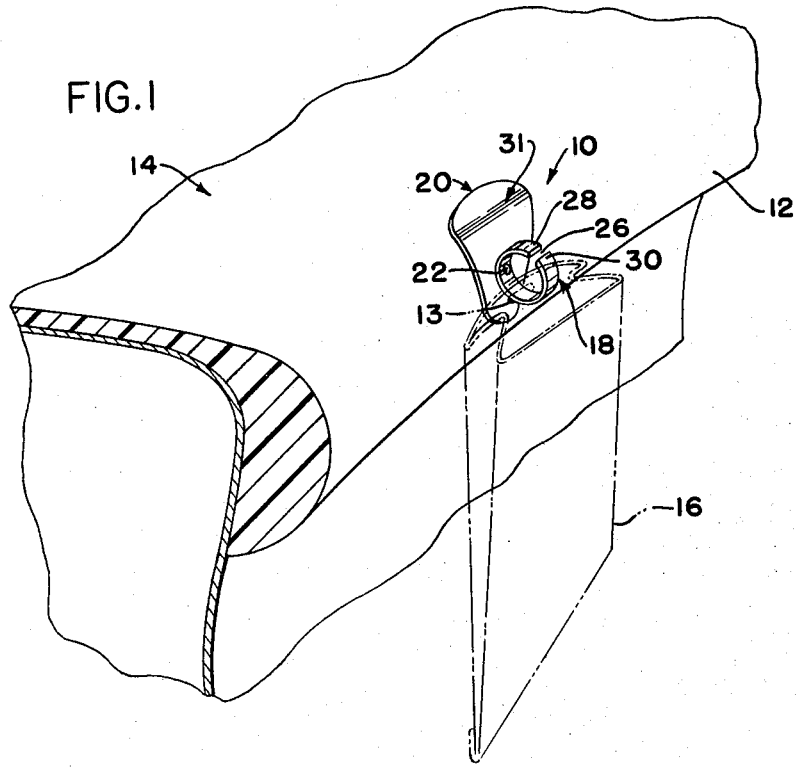
FIGURE 1 is a perspective view illustrating the support device according to the present invention mounted on a vehicle dashboard and supporting a litter bag.

Referring now to the drawings wherein the showings are for the purpose of illustrating the preferred embodiment of the invention only and not for purpose of limiting same, FIGURE 1 illustrates a supporting device 10 secured for example to the convex surface 12 of a vehicle dashboard 14 and supporting a litter bag 16.

As illustrated in greater detail in FIGURES 2 through 5 the supporting device 10 according to the present invention takes the form of a resilient split ring 18 suitably secured at a point spaced from the split to one side of a flexible mounting sheet 20.

Figure 3:
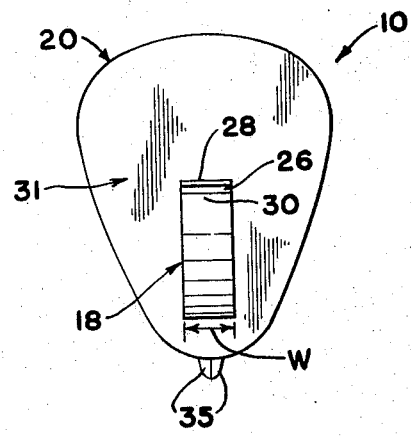
FIGURE 3 is an elevational view of the support device.

The split ring 18 is preferably constructed of resilient translucent plastic material such as polyethylene and may be annular in cross section and flattened somewhat at 24 as illustrated in FIGURE 4 or of another configuration if desired. The ring 18 is provided with a slit or opening 26 defining two leg portions 28 and 30. Several rings 18 may be formed by providing a longitudinally extending slit in an elongated polyethylene tube and thereafter or concurrently therewith transversely cutting the tube at axially spaced points so as to obtain split rings 18. In this manner the width $w$ of each ring, as illustrated in FIGURE 3, may be varied as desired. It is evident that in this manner rings 18 may be manufactured inexpensively since reject water hose tubes or the like having objectional breaks in the walls thereof may be effectively used in the manufacture of split rings 18.

The flexible mounting sheet 20 is also preferably constructed of translucent plastic material such as polyethylene and sufficiently thin walled to be quite flexible so as to readily conform with the surface of the body of intended application whether the surface be convex, concave, flat or irregular. Whereas the sheet 20 is preferably translucent it may be transparent or opaque if desired. Also, if desired, sheet 20 may take the form of a thin walled flexible aluminum sheet which is easily adapted for printing of labels on one side.

Figure 2:
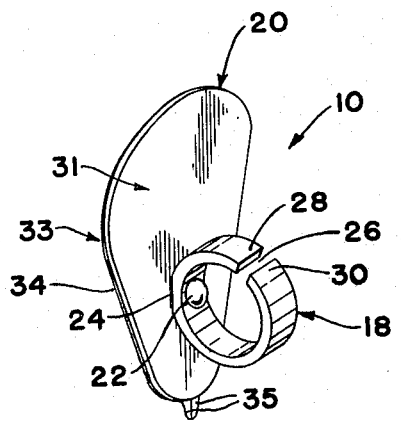
FIGURE 2 is an enlarged perspective view illustrating the inventive support device.

The sheet may be of a shield shape as illustrated in FIGURES 2 and 3 or another desired shape such as rectangular or circular.

The ring 18 may be secured to the mounting sheet in any suitable way such as adhesives, heat welding, or by means of a rivet 22 as shown. To facilitate the riveting the ring 18 has a flattened portion 24 to increase the area of contact with sheet 20. This area should not be too great.

During assembly of the supporting device one side now referred to as the front side 31 of the mounting sheet 20 and the split ring 18 are positioned with respect to each other so that the sheet 20 is in substantial tangential relationship with the outer curvature of ring 18 i.e., at flattened portion 24 of ring 18 whereby the ring projects outwardly from side 31. Ring 18 may be vertically oriented relative to sheet 20 as shown in FIGURE 3 or canted to one side if desired. Preferably ring 18 is rotated about its tubular axis so that opening 26 is located at approximately 60° from horizontal as viewed in FIGURES 3 and 4. Thereafter a rivet 22 is applied so as to secure ring 18 at a point intermediate like portions 28 and 30 to the sheet member 20 at the point of tangential contact i.e., at portion 24. By so securing ring 18 to the sheet member 20 at a point of contact, sheet 20 exhibits a sufficient flexibility throughout its entire surface area that it may be applied to either flat, convex, concave or irregular surfaces with equal effectiveness.

As shown in FIGURE 5, a layer of pressure sensitive adhesive 32 is provided on the reverse or back side 33 of sheet 20 so that the support device 10 may be easily secured as by applying pressure to the front side 31 to a dashboard 14. Alternatively, if desired, a solvent activated backing could be used in place of pressure adhesive layer 32. A split backing material 34 is provided to cover and protect the adhesive layer 32 until application and tabs 35 depending from the split backing material 34 facilitate removal of the backing material prior to applying sheet member 20 to dashboard 14.

In operation an object such as litter bag 16, provided with a suitable opening 13, may be hooked onto the split ring 18 by means of the opening 13 and supported by leg portion 30. For ease of installation and removal of litter bag 16 the leg portion 30 may be bent as by applying finger force in direction F so as to displace leg portion 30 from its normal position A (see the solid lines in FIGURE 4) to its receive-removal position B (the lowermost dotted lines in FIGURE 4). After force F has been removed, leg portion 30 will quickly return to an intermediate position C and after a greater period will return to its normal position A. Thus, this characteristic of leg portion 30 i.e., its ability to return quickly from position B to position A may be defined as a partial memory. It is a characteristic of polyethylene plastics. Other plastics having similar characteristics may be used. This characteristic facilitates ease of assembly of bag 16 to the support device 10 with accompanying retention of the bag in place upon return of the leg portion toward its normal position A.

The upper leg portion 28 of split ring 18 serves as a guard to prevent accidental opening of the split ring, i.e., it minimizes any tendency of leg portion 30 from being displaced toward position B upon accidental dropping of an object on the support ring 18.

Although the invention has been shown in connection with a preferred embodiment it will readily be apparent to those skilled in the art that various changes in form and in arrangement of parts may be made to suit requirements without departing from the spirit and scope of the invention as defined by the appended claims.

Having thus described my invention, I claim:

1. A support device for adhesive application to a surface and comprising a relatively thin walled flexible sheet member having an adhesive coating on one side to facilitate adhesion of said member to a surface, and a resilient support member secured to said sheet member so as to make at least narrow surface contact therewith to permit sufficient flexibility of said sheet member to allow mounting of said sheet member on an irregular surface, said support member taking the form of a split ring defining first and second leg portions, said first leg portion extending outwardly and upwardly from said sheet member to receive and support an object.

2. A support device as set forth in claim 1 wherein said split ring is secured to said sheet member on its outer curvature so that said ring is in substantial tangential relationship with said sheet member.

3. A support device as set forth in claim 1 wherein said narrow surface contact is located between said first and second leg portions.

4. A support device as set forth in claim 1 wherein said first leg exhibits a partial memory so that when bent away from its normal position it will thereafter return toward said normal position.

5. A support device as set forth in claim 1 wherein said second leg portion extends outwardly and downwardly defining a protective guard for said first leg to prevent accidental bending of said first leg.

6. A support device as set forth in claim 1 wherein said split ring is secured to said sheet member by means of a rivet.

References Cited by the Examiner

UNITED STATES PATENTS

| 264,947 | 9/1882 | Heyl | 248—304 |
| 1,495,485 | 5/1924 | Jerseman | 248—301 |
| 1,560,029 | 11/1925 | Erickson | 248—304 |
| 2,304,967 | 12/1942 | Tiryakian | 248—304 |
| 2,467,380 | 4/1949 | Hansen | 2—336 |
| 2,765,998 | 10/1956 | Engert | 248—29 |
| 3,016,224 | 1/1962 | Hall | 248—205 |

FOREIGN PATENTS 461,277 2/1937 Great Britain.

CLAUDE A. LE ROY, *Primary Examiner.*

K. J. WINGERT, *Assistant Examiner.*